(12) United States Patent
Ito et al.

(10) Patent No.: US 8,830,706 B2
(45) Date of Patent: Sep. 9, 2014

(54) SOFT-START CIRCUIT

(75) Inventors: Koichi Ito, Niiza (JP); Takamune Suzuki, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 283 days.

(21) Appl. No.: 13/370,826

(22) Filed: Feb. 10, 2012

(65) Prior Publication Data

US 2012/0235657 A1  Sep. 20, 2012

(30) Foreign Application Priority Data

Mar. 16, 2011  (JP) ................................. 2011-058071

(51) Int. Cl.
*H02M 1/36* (2007.01)

(52) U.S. Cl.
CPC .............. *H02M 1/36* (2013.01); *Y10S 323/901* (2013.01)
USPC ............................................ 363/49; 323/901

(58) Field of Classification Search
CPC ........................ H02M 1/36; H02M 2001/0048
USPC ............................................ 363/49; 323/901
See application file for complete search history.

(56) References Cited

U.S. PATENT DOCUMENTS

| | | | | |
|---|---|---|---|---|
| 6,815,938 | B2 * | 11/2004 | Horimoto | 323/282 |
| 7,088,078 | B2 * | 8/2006 | Liu | 323/207 |
| 7,619,397 | B2 * | 11/2009 | Al-Shyoukh | 323/281 |
| 7,839,376 | B2 * | 11/2010 | Shin et al. | 345/102 |
| 2008/0258698 | A1 * | 10/2008 | Kitagawa | 323/284 |

FOREIGN PATENT DOCUMENTS

| | | |
|---|---|---|
| JP | 9-154275 A | 6/1997 |
| JP | 2006-304510 A | 11/2006 |
| JP | 2010-136577 A | 6/2010 |

* cited by examiner

*Primary Examiner* — Harry Behm
(74) *Attorney, Agent, or Firm* — Birch, Stewart, Kolasch & Birch, LLP

(57) ABSTRACT

Provided is a soft-start circuit which is capable of reducing the current consumption after the output of a switching power supply apparatus having been raised. It comprises a soft-start generation unit 30 for generating a soft-start voltage Vss gradually raised from 0V by charging an external capacitor Css connected thereto; a power supply unit 20 for detecting the termination of a soft-start for supplying power to the soft-start generation unit 30; and a power supply judgment unit 40 for causing the supply of power from the power supply unit 20 to the soft-start generation unit 30 to be shut down. The power supply judgment unit 40 causes the supply of power from the power supply unit 20 to the soft-start generation unit 30 to be shut down after the soft-start voltage Vss having reached the reference voltage Vref.

3 Claims, 4 Drawing Sheets

SOFT-START CIRCUIT

BACKGROUND OF THE INVENTION

1. Field of the Invention

The present invention relates to a soft-start circuit to be provided in a switching power supply apparatus, such as a DC-DC converter.

2. Description of the Related Art

The switching power supply apparatus, such as a DC-DC converter, generally includes an error amplifier for comparing an output voltage with a reference voltage, being configured so as to control the switching operation in accordance with the output of the error amplifier, and is provided with a soft-start circuit for gradually raising the reference voltage to be compared with the output voltage at power-up (for example, Patent Document 1). By providing a soft-start circuit, it is made possible to prevent the output of the DC-DC converter from overshooting due to a rush current into a load at power-up, or to adjust the soft-start time for establishing the order of starting with respect to the other ICs loaded on the same power supply substrate.

CITATION LIST

Patent Literature

[Patent Document 1]
Japanese Unexamined Patent Application Publication No. Hei 09-154275

However, with the aforementioned conventional soft-start circuit, there has been a problem that, regardless of the fact that, once the output of the switching power supply apparatus being raised, it is not in use, becoming unnecessary, the current is consumed wastefully in the circuit, resulting in current consumption of no use.

In view of the aforementioned problem of the prior art, the present invention has been made to solve such a problem and provide a soft-start circuit which allows reduction of the current consumption after the output of the switching power supply apparatus being raised.

SUMMARY OF THE INVENTION

According to an aspect of the present invention, there is provided a soft-start circuit provided in a control circuit of a switching power supply apparatus, comprising: a soft-start generation unit which generates a soft-start voltage gradually raised from 0V by charging a capacitor connected thereto; a power supply unit which supplies power to the soft-start generation unit; and a power supply judgment unit which detects the termination of a soft-start for causing the supply of power from the power supply unit to the soft-start generation unit to be shut down.

According to another aspect of the present invention, there is provided a soft-start circuit, wherein the power supply judgment unit causes the supply of power from the power supply unit to the soft-start generation unit to be shut down after the soft-start voltage having reached a reference voltage.

According to another aspect of the present invention, there is provided a soft-start circuit, wherein, after the supply of power from the power supply unit to the soft-start generation unit having been shut down, the power supply unit maintains the soft-start voltage at a value higher than the reference voltage.

According to the present invention, after the output of the switching power supply apparatus having been raised, the current consumption can be reduced, which will lead to contribution to energy saving.

DETAILED DESCRIPTION OF THE PREFERRED EMBODIMENT

Figure 1:
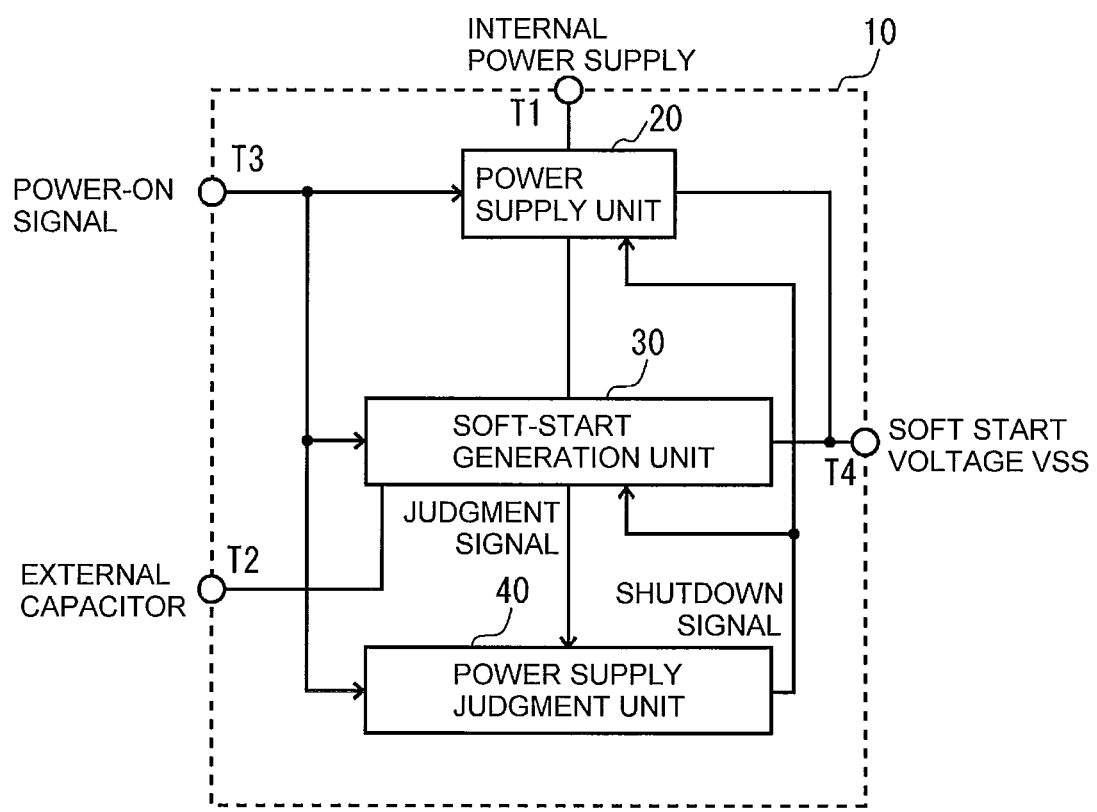
FIG. 1 is a block diagram illustrating the configuration of an embodiment of a soft-start circuit according to the present invention.

A soft-start circuit 10 of the present embodiment is a circuit for gradually increasing the output pulse width of a control IC for controlling the switching operation from zero in a switching power supply apparatus, such as a DC-DC converter, and as shown in FIG. 1, it includes a power supply unit 20, a soft-start generation unit 30, and a power supply judgment unit 40. The soft-start circuit 10 is configured such that, when a judgment signal indicating that the soft-start has been terminated is input to the power supply judgment unit 40 from the soft-start generation unit 30, the power supply judgment unit 40 outputs a shutdown signal to the power supply unit 20 and the soft-start generation unit 30 for shutting down the supply of power from the power supply unit 20 to the soft-start generation unit 30 to disconnect the soft-start generation unit 30 from an internal power supply.

The soft-start circuit 10 is provided with four terminals T1 to T4. The terminal T1 is connected to the internal power supply of a control IC for controlling the switching operation, and the internal power supply voltage is supplied to the power supply unit 20. The terminal T2 is connected to an external terminal of the control IC which is connected to an external capacitor, and by charging the external capacitor with the soft-start generation unit 30, a soft-start time is generated. The terminal T3 is connected to an initialization circuit (not shown) of the control IC, and the initialization circuit outputs a power-on signal notifying that the internal power supply has reached a predetermined voltage to the power supply unit 20, the soft-start generation unit 30, and the power supply judgment unit 40, respectively. The terminal T4 is a terminal at which a soft-start voltage Vss is output, being connected to the input terminal of an error amplifier for performing feedback control of the output voltage in the switching power supply apparatus.

Figure 2:
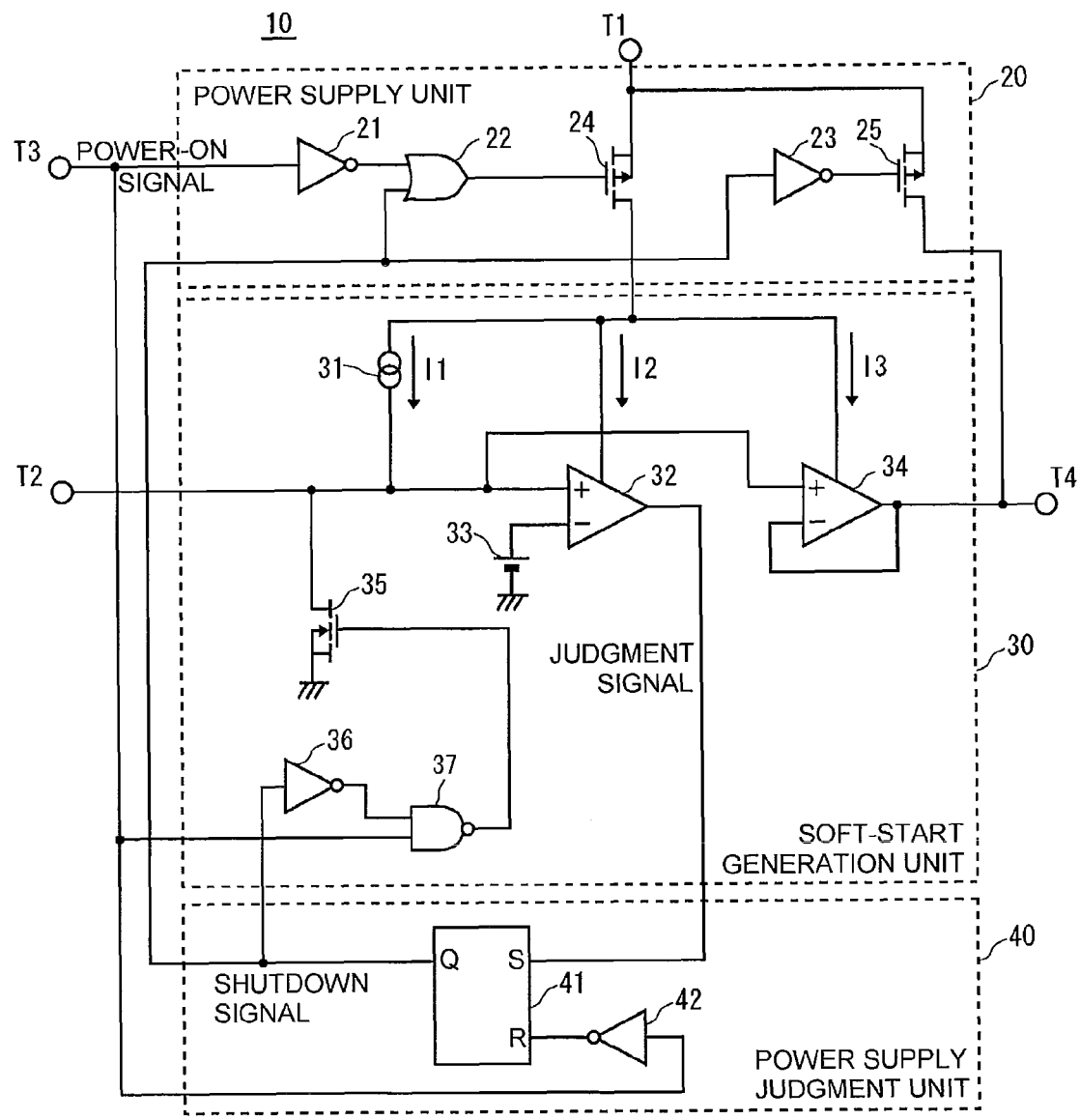
FIG. 2 is a circuit configuration diagram illustrating a specific circuit configuration of the soft-start circuit as shown in FIG. 1.

As shown in FIG. 2, the power supply unit 20 includes a NOT circuit 21, an OR circuit 22, a NOT circuit 23, and switches 24 and 25 each constituted by a P-channel MOSFET. Further, the soft-start generation unit 30 includes a constant current circuit 31, a comparator 32, a reference voltage 33 which is set at the soft-start termination judgment voltage, a buffer amplifier 34, a switch 35 constituted by an N-channel MOSFET, a NOT circuit 36, and a NAND circuit 37. Further, the power supply judgment unit 40 includes a latch circuit 41 giving a higher priority to the reset, and a NOT circuit 42.

The terminal T3 to which a power-on signal is input is connected to one input terminal of the OR circuit 22 through the NOT circuit 21 in the power supply unit 20. In addition, the terminal T3 is connected to one input terminal of the NAND circuit 37 in the soft-start generation unit 30. Further, the terminal T3 is connected to a reset input terminal R of the latch circuit 41 through the NOT circuit 42 in the power supply judgment unit 40.

An output terminal Q of the latch circuit 41 at which a shutdown signal is output is connected to the other input terminal of the OR circuit 22 in the power supply unit 20, and connected to the gate terminal of the switch 25 through the NOT circuit 23. In addition, the output terminal Q of the latch circuit 41 is connected to the other input terminal of the NAND circuit 37 through the NOT circuit 36 in the soft-start generation unit 30.

The output terminal of the OR circuit 22 is connected to the gate terminal of the switch 24, and the source terminal of the switch 24 is connected to the terminal T1, while the drain terminal of the switch 24 is connected to the power input terminals of the constant current circuit 31, the comparator 32, and the buffer amplifier 34 in the soft-start generation unit 30, respectively. Accordingly, if the switch 24 is turned on, power is supplied to the soft-start generation unit 30 from the power supply unit 20, while, if the switch 24 is turned off, the supply of power from the power supply unit 20 to the soft-start generation unit 30 is shut down. In addition, the on-off control of the switch 24 is performed on the basis of a power-on signal input to the terminal T3, and a shutdown signal output at the output terminal Q of the latch circuit 41. In the case where the power-on signal is at a H (High) level and the shutdown signal is at a L (Low) level, the switch 24 is turned on, while, in the case where the power-on signal is at the "L" level or the shutdown signal is at the "H" level, the switch 24 is turned off.

The source terminal of the switch 25 is connected to the connection point between the source terminal of the switch 24 and the terminal T1, while the drain terminal of the switch 25 is connected to the terminal T4. Accordingly, when the switch 25 is turned on, the reference voltage which is output at the terminal T4 is changed over to the internal power supply voltage. In addition, the on-off control of the switch 25 is performed on the basis of a shutdown signal output at the output terminal Q of the latch circuit 41. In the case where the shutdown signal is at the "L" level, the switch 25 is turned off, while, in the case where the shutdown signal is at the "H" level, the switch 25 is turned on.

The terminal T2 to which the external capacitor is connected is connected to the output terminal of the constant current circuit 31 in the soft-start generation unit 30, while being connected to the non-inverting input terminals of the comparator 32 and the buffer amplifier 34, respectively. In addition, the output terminal of the buffer amplifier 34 is connected to the terminal T4, while being connected to the inverting input terminal of itself. Accordingly, in the state in which the switch 24 of the power supply unit 20 is turned on, the external capacitor which is connected to the terminal T2 is charged by the constant current circuit 31, and the voltage of the external capacitor, in other words, the voltage V0 of the terminal T2 is amplified by the buffer amplifier 34 to be output at the terminal T4 as a soft-start voltage Vss.

In addition, to the inverting input terminal of the comparator 32 is connected the reference voltage 33 which is set at the soft-start termination judgment voltage, while the output terminal of the comparator 32 being connected to the set input terminal S of the latch circuit 41 in the power supply judgment unit 40. Accordingly, the result of comparison performed between the voltage of the external capacitor, in other words, the voltage V0 at the terminal T2 and the soft-start termination judgment voltage by the comparator 32 is output to the power supply judgment unit 40 from the soft-start generation unit 30 as a judgment signal.

In addition, the output terminal Q of the latch circuit 41 at which a shutdown signal is output is connected to the NAND circuit 37 through the NOT circuit 36 in the soft-start generation unit 30. In addition, the output terminal of the NAND circuit 37 is connected to the gate terminal of the switch 35, while the drain terminal of the switch 35 is connected to the terminal T2, the source terminal of the switch 35 being grounded. Accordingly, when the switch 35 is turned on, the terminal T2 is grounded with the charge accumulated in the external capacitor connected to the terminal T2 being discharged. In addition, the on-off control of the switch 35 is performed on the basis of a power-on signal input to the terminal T3, and a shutdown signal output at the output terminal Q of the latch circuit 41. In the case where the power-on signal is at the "H" level and the shutdown signal is at the "L" level, the switch 24 is turned off, while, in the case where the power-on signal is at the "L" level or the shutdown signal is at the "H" level, the switch 24 is turned on.

Figure 3:
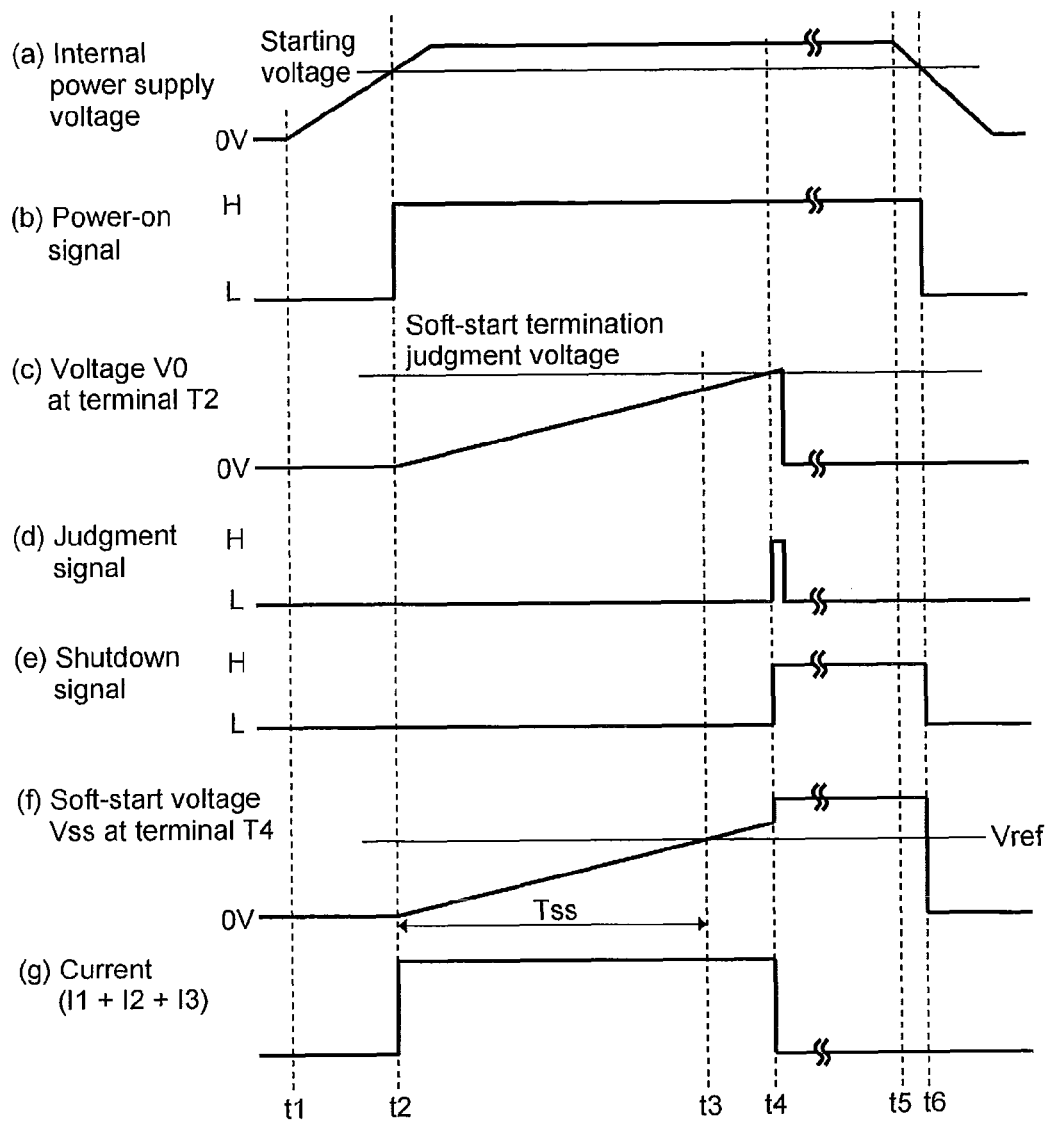
FIG. 3 is a waveform diagram illustrating the signal waveform and the operation waveform of each component in FIG. 2.

FIG. 3 shows the signal waveforms and the operation waveforms of the respective components in FIG. 2. From top, (a) shows a voltage signal of the internal power supply voltage; (b) a power-on signal input to the terminal T3; (c) a voltage V0 at the terminal T2; (d) a judgment signal output from the soft-start generation unit 30; (e) a shutdown signal output from the power supply judgment unit 40; (f) a soft-start voltage Vss at the terminal T4; and (g) a current (I1+I2+I3) supplied to the soft-start generation unit 30 from the power supply unit 20, respectively.

When the power is turned on at time t1, the internal power supply voltage in the control IC is raised as shown in FIG. 3 (a). When the internal power supply voltage reaches the starting voltage at time t2, the initialization circuit 53 detects that the internal power supply voltage in the control IC has been raised, switching over the power-on signal from a "L" level one to a "H" level one as shown in FIG. 3 (b).

In the initialized state of time t1 to t2 until the internal power supply voltage reaches the starting voltage, the power-on signal output from the initialization circuit is at the "L" level. Accordingly, the signal, which has been changed over to a "H" level one through the NOT circuit 42, is input to the reset input terminal R of the latch circuit 41 in the power supply judgment unit 40, resulting in the latch circuit 41 being reset. Thereby, as shown in FIG. 3 (e), the shutdown signal output at the output terminal Q of the latch circuit 41 is changed over to a "L" level one, being maintained at the "L" level until the latch circuit 41 is set. In addition, the power-on signal is changed over to a "H" level one in the power supply unit 20, and the signal, which has been changed over to a "H" level one, is input to one input terminal of the OR circuit 22 through the NOT circuit 21, resulting in the output of the OR circuit 22 being changed over to a "H" level one. Thereby, to the gate terminal of the switch 24 is input a signal at the "H" level, the switch 24 being brought into the off-state, resulting in the soft-start generation unit 30 being not supplied with power from the power supply unit 20. Further, since the shutdown signal is at the "L" level, in the power supply unit 20, a signal at the "H" level is input to the gate terminal of the switch 25 through the NOT circuit 23, resulting in the switch 25 being in the off-state. Furthermore, since the shutdown signal is at the "L" level, and the power-on signal is at the "L" level, in the soft-start generation unit 30, the output of the NAND circuit 37 is at the "H" level. Thereby, to the gate terminal of the switch 35 is input a signal at the "H" level, resulting in the switch 25 being brought into the on-state, the terminal T2 being grounded to be placed at the GND level.

When the power-on signal is switched over from a "L" level one to a "H" level one at time t2, the signal, which has been changed over to a "L" level one through the NOT circuit 42, is input to the reset input terminal R of the latch circuit 41 in the power supply judgment unit 40, resulting in the latch circuit 41 being capable of receiving a signal to the set input terminal S. At this point of time, the judgment signal input to the set input terminal S of the latch circuit 41 from the soft-start generation unit 30 (comparator 32) is at the "L" level, and the shutdown signal output at the output terminal Q of the latch circuit 41 being at the "L" level. In addition, in the power supply unit 20, the power-on signal is changed over to a "L" level one through the NOT circuit 21, while the shutdown signal being also at the "L" level, resulting in the output of the OR circuit 22 being at the "L" level. Thereby, to the gate terminal of the switch 24 is input a signal at the "L" level, the switch 24 being brought into the on-state. Further, since the shutdown signal is at the "L" level, in the power supply unit 20, a signal at the "H" level is input to the gate terminal of the switch 25 through the NOT circuit 23, the switch 25 remaining in the off-state. Furthermore, since the shutdown signal is at the "L" level, while the power-on signal being at the "H" level, in the soft-start generation unit 30, the output of the NAND circuit 37 is at the "L" level. Thereby, to the gate terminal of the switch 35 is input a signal at the "L" level, the switch 35 being brought into the off-state.

In this way, when the power-on signal is switched over from a "L" level one to a "H" level one at time t2, the switch 24 in the power supply unit 20 is brought into the on-state, the switch 25 in the power supply unit 20 into the off-state, and the switch 35 in the soft-start generation unit 30 into the off-state. Since the switch 24 in the power supply unit 20 is brought into the on-state, the supply of power from the power supply unit 20 to the soft-start generation unit 30 is started as shown in FIG. 3 (g) with currents I1, I2 and I3 being supplied to the constant current circuit 31, the comparator 32 and the buffer amplifier 34 in the soft-start generation unit 30, respectively, the soft-start generation unit 30 initiating its operation. In addition, since the switch 35 in the soft-start generation unit 30 is in the off-state, the external capacitor connected to the terminal T2 is charged with the constant current I1 in the constant current circuit 31 in the soft-start generation unit 30, and as shown in FIG. 3 (c), the voltage V0 at the terminal T2 is gradually raised in accordance with the amount of charge stored on the external capacitor. Further, since the switch 25 in the power supply unit 20 is in the off-state, the voltage V0 at the terminal T2 is output at the terminal T4 as a soft-start voltage Vss amplified by the buffer amplifier 34, the soft-start voltage Vss being also gradually raised as shown in FIG. 3 (f).

The voltage V0 at the terminal T2 is compared with the soft-start termination judgment voltage by the comparator 32 in the soft-start generation unit 30, and as shown in FIG. 3 (c), when the voltage V0 at the terminal T2 reaches the soft-start termination judgment voltage at time t4, the judgment signal output from the comparator 32 is switched over from a "L" level one to a "H" level one as shown in FIG. 3 (d). The judgment signal at the "H" level is input to the set input terminal S of the latch circuit 41 in the power supply judgment unit 40, and as shown in FIG. 3 (e), the shutdown signal output at the output terminal Q of the latch circuit 41 is switched over from a "L" level one to a "H" level one.

When the shutdown signal is switched over from a "L" level one to a "H" level one at time t4, the input to the other input terminal of the OR circuit 22 is changed over to a "H" level one in the power supply unit 20, resulting in the output of the OR circuit 22 being changed over to a "H" level one. Thereby, to the gate terminal of the switch 24 is input a signal at the "H" level, the switch 24 being brought into the off-state. Further, since the shutdown signal is changed over to a "H" level one, in the power supply unit 20, a signal at the "L" level is input to the gate terminal of the switch 25 through the NOT circuit 23, the switch 25 being brought into the on-state. Furthermore, since the shutdown signal is changed over to a "H" level one, in the soft-start generation unit 30, a signal at the "L" level is input to the one input terminal of the NAND circuit 37 through the NOT circuit 36, the output of the NAND circuit 37 being changed over to a "H" level one. Thereby, to the gate terminal of the switch 35 is input a signal at the "H" level, the switch 35 being brought into the on-state.

In this way, when the shutdown signal is switched over from a "L" level one to a "H" level one at time t4, the switch 24 in the power supply unit 20 is brought into the off-state, the switch 25 in the power supply unit 20 into the on-state, and the switch 35 in the soft-start generation unit 30 into the on-state. Since the switch 24 in the power supply unit 20 is brought into the off-state, the supply of power from the power supply unit 20 to the soft-start generation unit 30 is shut down, the soft-start generation unit 30 being disconnected from the internal power supply voltage. Thereby, as shown in FIG. 3 (g), the currents I1, I2, and I3 to be supplied to the constant current circuit 31, the comparator 32, and the buffer amplifier 34 in the soft-start generation unit 30, respectively, are shut down, thereby an advantage that the current consumption is reduced is provided. In addition, since the switch 35 in the soft-start generation unit 30 is brought into the on-state, the charge accumulated in the external capacitor connected to the terminal T2 is discharged, and as shown in FIG. 3 (c), the voltage V0 at the terminal T2 is reduced to 0V, the judgment signal output from the comparator 32 in the soft-start generation unit 30 being also changed to a "L" level one as shown in FIG. 3 (d). Further, since the switch 25 in the power supply unit 20 is brought into the on-state, the soft-start voltage Vss at the terminal T4 connected to the output of the buffer amplifier 34 is brought up to the internal power supply voltage as shown in FIG. 3 (f). At this time, the output of the buffer amplifier 34 has a high impedance, thereby the current will not leak from the internal power supply voltage to the output and the inverting input terminal of the buffer amplifier 34.

Next, if the power is turned off at time t5, the internal power supply voltage of the control IC falls as shown in FIG. 3 (a). When the internal power supply voltage is reduced to under the starting voltage at time t6, the initialization circuit detects that the internal power supply voltage of the control IC has been lowered, and switches over the power-on signal from a "H" level one to a "L" level one as shown in FIG. 3 (b). With the power-on signal being switched over from a "H" level one to a "L" level one, the initialized state in the period of time t1 to t2 is restored.

Figure 4:
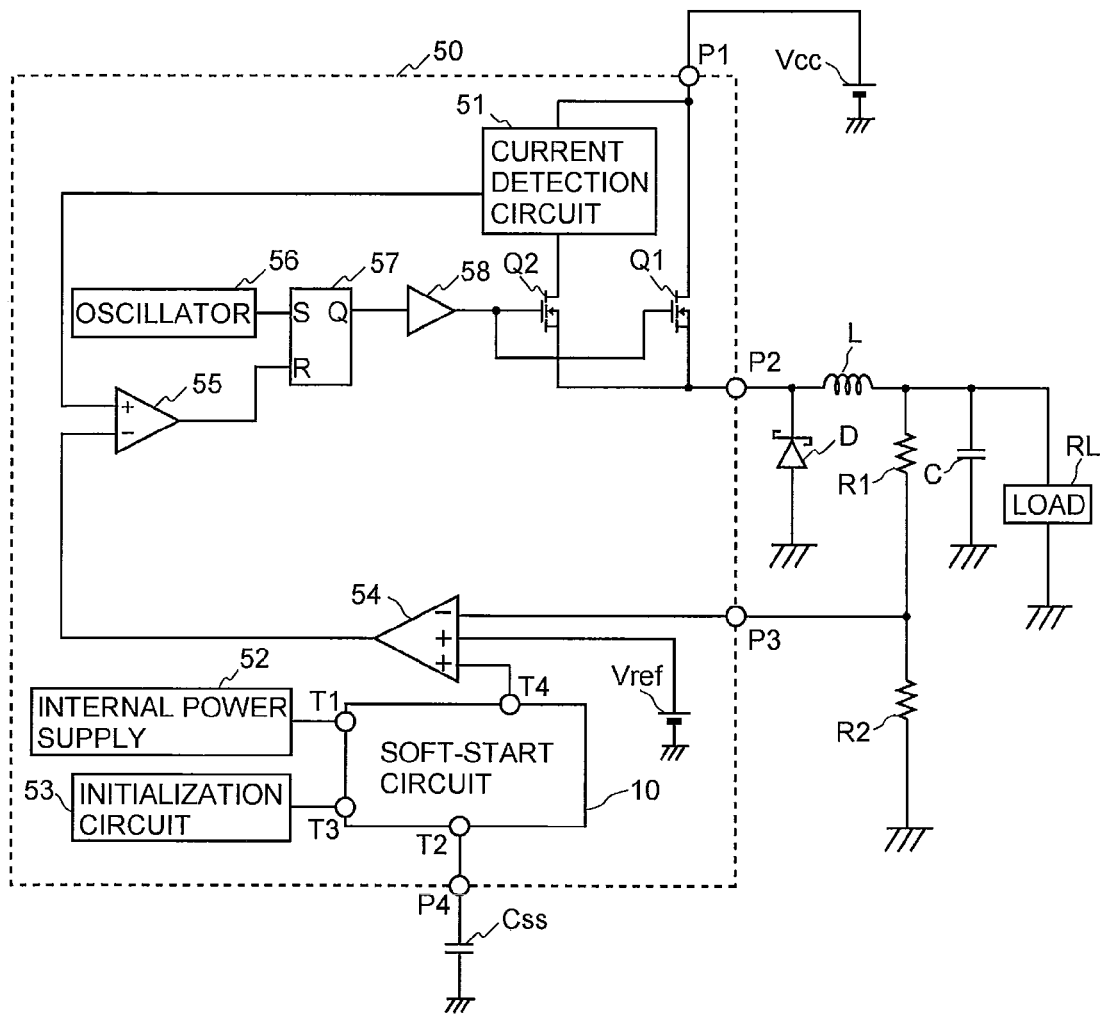
FIG. 4 is a circuit configuration diagram illustrating a step down DC-DC converter which is implemented with a soft-start circuit as shown in FIG. 1.

FIG. 4 shows a step down DC-DC converter which is implemented with a soft-start circuit 10 of the present embodiment. As shown in FIG. 4, the control IC 50 in which the soft-start circuit 10 is incorporated includes a power MOSFET Q1 as a switching device, a sense MOSFET Q2 for current detection, and four terminals P1 to P4. The drain terminal of the power MOSFET Q1 is directly connected to the terminal P1, and the drain terminal of the sense MOSFET Q2 is connected thereto through the current detection circuit 51, with the source terminals of the power MOSFET Q1 and the sense MOSFET Q2 being connected to the terminal P2. To the terminal P1 is input the power supply voltage Vcc, which is the DC input voltage, and the power supply voltage Vcc input to the terminal P1 is turned on/off by the MOSFET Q1 to be output at the terminal P2. The output from the terminal P2 is smoothed by the energy accumulation coil L, the smoothing capacitor C, and the Schottky barrier diode D, the output voltage and the output current being supplied to the load RL. The output voltage is divided by the voltage dividing resistors R1 and R2 to be input to the terminal P3. In addition, to the terminal P4, which is connected to the terminal T2 of the soft-start circuit 10, an external capacitor Css for generating a soft-start time is connected.

In addition, the control IC 50 includes an internal power supply 52, which is connected to the terminal T1 of the soft-start circuit 10; an initialization circuit 53, which is connected to the terminal T3 of the soft-start circuit 10; an error amplifier 54; a reference voltage Vref; a comparator 55; an oscillator 56; a flip-flop 57; and a drive circuit 58. The output of the error amplifier 54 is compared with the current flowing through the power MOSFET Q1 by the comparator 55, and when the current flowing through the power MOSFET Q1 exceeds the output of the error amplifier 54, the flip-flop 57, which has been set by a pulse signal output from the oscillator 56 at a predetermined frequency, is reset. The output of the flip-flop 57 is input to the drive circuit 58, and the power MOSFET Q1 and the sense MOSFET Q2 are controlled on/off by the drive circuit 58.

To the non-inverting input terminals of the error amplifier 54 are input the reference voltage Vref and a soft-start voltage Vss which is generated by the soft-start circuit 10. With the error amplifier 54, the voltage whichever is lower of the non-inverting inputs is preferentially made valid as the reference voltage, and the difference between the lower voltage and the voltage input to the terminal P3 (the output voltage) is amplified to be output. Accordingly, at the start of the DC-DC converter, since the soft-start voltage Vss is gradually raised from 0V, the soft-start voltage Vss is first used as a valid reference voltage, and once the soft-start voltage Vss exceeds the reference voltage Vref, the reference voltage Vref is used as a valid reference voltage. If the period of time from the moment when the soft-start voltage Vss starts to rise to the moment when it crosses the reference voltage Vref (time t2 to t3) is defined as the soft-start time Tss as shown in FIG. 3 (*f*), and the capacitance of the external capacitor Css connected to the terminal T2 of the soft-start circuit 10 is Css, and the constant current of the constant current circuit 31 is I1, Tss=(Css*Vref)/I1.

In the present embodiment, the timing at which the supply of power from the power supply unit 20 to the soft-start generation unit 30 is shut down is preferably after the soft-start voltage Vss has reached the reference voltage Vref. In other words, when the soft-start voltage Vss reaches the reference voltage Vref, the voltage to be compared with the voltage (output voltage) input to the terminal P3 is smoothly switched over from the soft-start voltage Vss to the reference voltage Vref with no abrupt change in voltage to be compared with the voltage (output voltage) input to the terminal P3, whereby occurrence of a rush current into the load at power-up can be effectively prevented.

As described above, the soft-start circuit 10 of the present embodiment is provided with a soft-start generation unit 30 which generates a soft-start voltage Vss gradually raised from 0V by charging the external capacitor Css connected thereto; a power supply unit 20 which supplies power to the soft-start generation unit 30; and a power supply judgment unit 40 which detects the termination of the soft-start for causing the supply of power from the power supply unit 20 to the soft-start generation unit 30 to be shut down, resulting in no current being consumed in the soft-start generation unit 30 after the output of the switching power supply apparatus having been raised, whereby the current consumption can be reduced, which will lead to contribution to energy saving.

Further, with the soft-start circuit 10 of the present embodiment, the power supply judgment unit 40 causes the supply of power from the power supply unit 20 to the soft-start generation unit 30 to be shut down after the soft-start voltage Vss having reached the reference voltage Vref, thereby the valid reference voltage is smoothly switched over from the soft-start voltage Vss to the reference voltage Vref with no abrupt change in voltage to be compared with the voltage (output voltage) input to the terminal P3, whereby occurrence of a rush current into the load at power-up can be effectively prevented.

Further, by configuring the soft-start circuit 10 of the present embodiment such that, after the supply of power from the power supply unit 20 to the soft-start generation unit 30 having been shut down, the soft-start voltage Vss is maintained at a value higher than the reference voltage Vref by the power supply unit, the reference voltage Vref will be valid in the error amplifier 54, even if the supply of power to the soft-start generation unit 30 for generating a soft-start voltage Vss is shut down.

Heretofore, the preferred embodiment of the present invention has been explained, however, such embodiment is only an exemplification, and various changes and modifications thereof may be made without departing from the spirit and the scope thereof.

What is claimed is:

1. A soft-start circuit provided in a control circuit of a switching power supply apparatus, comprising:
   a charge circuit which charges an external capacitor connected thereto;
   a detection circuit which detects the termination of a soft-start based on the charged voltage of the external capacitor;
   a soft-start generation circuit which generates a soft-start voltage gradually raised from 0V based on the charged voltage of the external capacitor;
   a power supply unit which supplies power to the charge circuit, the detection circuit, and the soft-start generation unit; and
   a power supply judgment unit which causes the supply of power from the power supply unit to the charge circuit, the detection circuit, and the soft-start generation circuit to be shut down when the detection circuit detects the termination of the soft-start.

2. The soft-start circuit of claim 1, wherein the detection circuit detects the termination of the soft-start by the charged voltage of the external capacitor having reached a reference voltage.

3. The soft-start circuit of claim 2, wherein, after the supply of power from the power supply unit to the charge circuit, the detection circuit, and the soft-start generation circuit having been shut down, a power supply judgment unit maintains a state of shut down until new power-on signal is input by a latch unit.

* * * * *